(12) United States Patent
Schneider et al.

(10) Patent No.: US 12,280,532 B2
(45) Date of Patent: Apr. 22, 2025

(54) DEVICE FOR SEPARATING A DEEP-DRAWN JAW-SPANNING DENTAL APPARATUS OF THERMOFORM FILM

(71) Applicant: DENTSPLY SIRONA Inc., York, PA (US)

(72) Inventors: Hans-Christian Schneider, Einhausen (DE); Peter Burger, Bensheim (DE)

(73) Assignee: Dentsply Sirona Inc., York, PA (US)

( * ) Notice: Subject to any disclaimer, the term of this patent is extended or adjusted under 35 U.S.C. 154(b) by 65 days.

(21) Appl. No.: 17/915,346

(22) PCT Filed: Mar. 11, 2021

(86) PCT No.: PCT/EP2021/056143
§ 371 (c)(1),
(2) Date: Sep. 28, 2022

(87) PCT Pub. No.: WO2021/197788
PCT Pub. Date: Oct. 7, 2021

(65) Prior Publication Data
US 2023/0144773 A1    May 11, 2023

(30) Foreign Application Priority Data
Mar. 20, 2020    (EP) ..................................... 20166850

(51) Int. Cl.
*B29C 51/44* (2006.01)
*A61C 7/08* (2006.01)
(Continued)

(52) U.S. Cl.
CPC .............. *B29C 51/445* (2013.01); *A61C 7/08* (2013.01); *B29C 51/08* (2013.01); *B29C 51/46* (2013.01); *B29L 2031/753* (2013.01)

(58) Field of Classification Search
CPC .................................................... B29C 51/445
See application file for complete search history.

(56) References Cited

U.S. PATENT DOCUMENTS

| 3,619,444 | A | * | 11/1971 | Roth | ...................... | B29C 51/00 |
| | | | | | | 264/548 |
| 10,466,676 | B1 | | 11/2019 | Do | | |
| 2008/0141534 | A1 | | 6/2008 | Hilliard | | |

FOREIGN PATENT DOCUMENTS

| EP | 3888586 A1 | 10/2021 |
| EP | 3888586 B1 | 11/2022 |
| WO | WO-2021197788 A1 | 10/2021 |

OTHER PUBLICATIONS

International Search Report; PCT/EP2021/056143; Jun. 1, 2021 (completed); Jun. 10, 2021 (mailed).
(Continued)

*Primary Examiner* — John J DeRusso
(74) *Attorney, Agent, or Firm* — SCHWEGMAN LUNDBERG & WOESSNER, P.A.

(57) ABSTRACT

A device for separating a deep-drawn jaw-spanning dental apparatus such as an aligner or a bite splint of thermoform film that includes: a separating element for thermally separating the deep-drawn thermoform film and simultaneously refining the separated deep-drawn thermoform film; a heating means for regulating the heating of the separating element so as to increase the temperature of the thermoform film substantially to at least its glass temperature; a support for supporting the deep-drawn thermoform film relatively movable with respect to the separating element; a moving mechanism for moving the separating element along a separation contour of the deep-drawn jaw-spanning dental apparatus relative to the support; and a control unit adapted to control the heating means and the moving mechanism based on the separation contour.

14 Claims, 1 Drawing Sheet

(51) Int. Cl.
 *B29C 51/08* (2006.01)
 *B29C 51/46* (2006.01)
 *B29L 31/00* (2006.01)

(56) References Cited

OTHER PUBLICATIONS

International Preliminary Report on Patentability; PCT/EP2021/056143; Jun. 1, 2021 (completed); Jun. 10, 2021 (mailed).
Written Opinion of the International Searching Authority; PCT/EP2021/056143; Jun. 1, 2021 (completed); Jun. 10, 2021 (mailed).
"European Application Serial No. 20166850.6, Extended European Search Report mailed Sep. 18, 2020", 5 pgs.

* cited by examiner

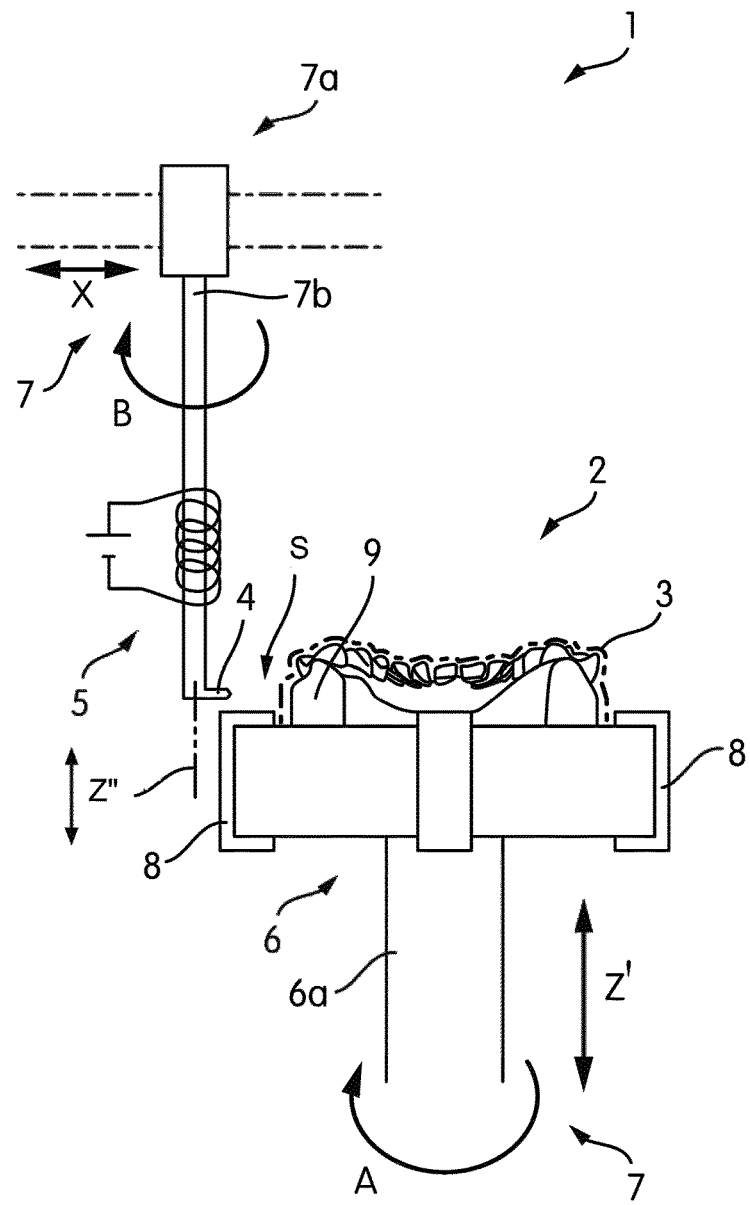

DEVICE FOR SEPARATING A DEEP-DRAWN JAW-SPANNING DENTAL APPARATUS OF THERMOFORM FILM

CROSS-REFERENCE TO RELATED APPLICATIONS

This is a National Phase application of International Application No. PCT/EP2021/056143, filed Mar. 11, 2021, which claims the benefit of and priority to European Application Ser. No. 20166850.6, filed on Mar. 30, 2020, which are herein incorporated by reference for all purposes.

TECHNICAL FIELD OF THE INVENTION

The present invention relates to a device for separating a deep-drawn jaw-spanning dental apparatus such as an aligner or a bite splint of thermoform film.

BACKGROUND OF THE INVENTION

Jaw-spanning dental apparatuses made of polymethylmethacrylate or similar materials, such as aligners or bite splints for the treatment of bruxism, are exposed to considerable masticatory loads during their use. For this reason, they are still manufactured using the deep-drawing process of thermoform films, despite modern production methods such as 3D printing. A relatively complicated post-process after deep-drawing of the thermoform film is the manual cutting and trimming of the deep-drawn thermoform film by means of milling, grinding and/or polishing tools. The manual cutting and trimming of the deep-drawn thermoform film is done, for example, with rotating instruments operated by a motorized handpiece. The resulting sharp edges must be smoothed in a time-consuming process.

SUMMARY OF THE INVENTION

An objective of the present invention is to overcome the problems of the prior art and to provide a device for separating a deep-drawn jaw-spanning dental apparatus such as an aligner or a bite splint of thermoform film.

This objective has been achieved through the device as defined in claim 1, and the method as defined in claim 14. The subject-matters of the dependent claims relate to further embodiments and developments.

The present invention provides a device for separating a deep-drawn jaw-spanning dental apparatus such as an aligner or a bite splint of thermoform film. The device comprises a separating element for thermally separating the deep-drawn thermoform film and simultaneously refining the separated deep-drawn thermoform film; a heating means for regulating the heating of the separating element so as to increase the temperature of the thermoform film substantially to at least its glass temperature; a support for supporting the deep-drawn thermoform film relatively movably with respect to the separating element; a moving mechanism for moving the separating element along a separation contour of the deep-drawn jaw-spanning dental apparatus relative to the support; and a control unit adapted to control the heating means and the moving mechanism based on the separation contour.

A major advantageous effect of the present invention is that by heating up the thermoform film substantially to at least its glass temperature, separation and refinement can take place in a single step. Thereby, the number of working steps can be reduced, and a fast and smooth separation process can be achieved, and also the overall process can be simplified. Another major advantageous effect of the present invention is that through the regulation of the temperature of the thermoform film substantially to at least its glass temperature, the separation of the thermoform film is possible without degradation and unnecessary melting thereof, and thus the risk of damaging the aligner or the bite splint can be prevented or reduced as much as possible. Another major advantageous effect of the present invention is that the deep-drawn thermoform film can be precisely separated along the separation contour without the need of any manual intervention.

According to the present invention, the temperature regulation may be performed through closed loop or open loop. According to the present invention, the heating means regulates heating of the separating element so that the temperature of the thermoform film never reaches the degradation temperature of the thermoform film and remains well below the degradation temperature of the thermoform film, preferably substantially at the glass temperature of the thermoform film or slightly above. Therefore, in an embodiment, a temperature sensor is used for sensing the temperature of the thermoform film in close proximity to the separating element. The heating means regulates heating of the separating element based on the sensed temperature. Alternatively, a thermodynamic model may be applied to the heating means to obviate the need of using the temperature sensor. Thus, the heating means may regulate heating of the separating element based on the thermodynamic model which takes account of a temperature drop between the separating element and the thermoform film in close proximity thereof. The thermodynamic model may be based on empirical data.

The deep-drawn jaw-spanning dental apparatus such as the aligner or the bite splint is usually made of polymethylmethacrylate (PMMA). Different types of polymethylmethacrylate (PMMA) are available. Therefore, in an embodiment, the heating means is further adapted to regulate heating of the separating element so as to increase the temperature of the thermoform substantially to at least 105 degrees Celsius which corresponds to the glass temperature of a commonly used type of polymethylmethacrylate. However, different type of thermoform films with other glass temperatures other than PMMA may be alternatively used. Therefore, alternatively, the user may be allowed to selectively set the heating means in accordance with the type of the thermoform film to be separated.

According to the present invention the support and the separating element can be relatively moved with respect to each other. The relative motion may be achieved in various different mechanical arrangements for causing translation and rotation. Therefore, in an embodiment, the position of the support can be changed along a first axis, preferably the vertical axis, and rotated around the same first axis. And the separating element can be radially moved towards or away from the first axis, and preferably also rotated around a second axis, preferably the vertical axis. The separating element is preferably supported in the radial direction by a rotatable arm. The support preferably comprises a turntable for supporting the deep-drawn thermoform film. The first and second axes are preferably parallel and vertical. The first and second axes may be alternatively non-parallel and/or in aligned in non-vertical directions.

According to the present invention, the separating element may be arranged to point towards the thermoform film at various angles which allow easy separation of the thermoform film. The angle may be fixed or adaptively varied based on the geometry of the separation contour. In an embodiment, the rotatable arm is rotated around the second axis such that the separating element points substantially in the direction of the radius of curvature at the corresponding separation contour.

According to the present invention, it is also desirable that the thermoform film of the deep-drawn jaw-spanning dental apparatus can be immobilized on a corresponding model relative to the support during the separation process. This may be achieved in various different mechanical arrangements. Therefore, in an embodiment, the thermoform film of the deep-drawn jaw-spanning dental apparatus is clamped on a corresponding model to the support through a clamping means which can be handled by the user.

According to the present invention, the separating element may be provided from metal, preferably iron and with various different shapes. Therefore, in alternative embodiments, the separating element is preferably provided in the form of a knife, a chisel, a spike, or a needle which is protruding in the radial direction.

According to the present invention, the information on the separation contour may be obtained in various different ways by the device. In an embodiment, the device receives information on the separation contour of the deep-drawn jaw-spanning dental apparatus preferably through a CAD/CAM means from an external source. Alternatively, the device constructs the information on the separation contour of the deep-drawn jaw-spanning dental apparatus preferably through the CAD/CAM means. An operator may be involved in the construction of the separation contour by using the CAD/CAM means, preferably a PC, a CAD/CAM software running on the PC, and a display for showing the model and the separation contour and the like. The model can be produced by a milling machine using the same or an additional CAD/CAM software. The milling machine can be connected to the CAD/CAM means, preferably to the PC.

According to the present invention, it is desirable that the deep-drawing can be performed by the device itself. Therefore, in an embodiment, the device further comprises a deep-drawing means for deep-drawing the thermoform film using a model to manufacture a deep-drawn jaw-spanning dental apparatus such as an aligner or a bite splint. The deep-drawing means is arranged above the support. And the control unit is further adapted to control the deep-drawing means. Alternatively, the deep-drawn jaw-spanning dental apparatus of thermoform film may be manufactured with another device and transferred onto the support together with the corresponding model and clamped thereon for the thermal separation process.

According to the present invention, the device can be calibrated in various ways. In an embodiment, the device further comprises a sensor for detecting the position of the separation element. And the control means performs the calibration through moving the separation element to one or more reference points relative to the support and the deep-drawn jaw-spanning dental apparatus and detecting the positions of the separation element as it is moved to one or more reference points. The calibration is performed based on the detection. The detection can be performed by a camera and an image processing means. Alternately other presence/absence sensors based on magnetic detection, current detection, acoustic detection, and the like may be used. The sensor may be coupled to the separating element to use the same as a probe without heating.

The present invention also provides a method of using the device. The method comprises, at least a step of deep-drawing a thermoform film using a model to manufacture a jaw-spanning dental apparatus such as an aligner or a bite splint; and a step of separating and refining the deep-drawn thermoform film while being clamped and supported by the model on the support and by moving the heated separating element along a separation contour on the thermoform film or the model.

BRIEF DESCRIPTION OF THE DRAWING

In the subsequent description, further aspects and advantageous effects of the present invention will be described in more detail by using exemplary embodiments and by reference to the drawing, wherein FIG. 1—is schematic partial view of the device according to an embodiment of the present invention.

DETAILED DESCRIPTION OF THE INVENTION

The reference numbers shown in the drawing denote the elements as listed below and will be referred to in the subsequent description of the exemplary embodiments:
1. Device
2. Dental apparatus
3. Thermoform film (dashed line)
4. Separating element
5. Heating means
6. Support
6a. Turntable
7. Moving mechanism
7a. Radial guiding means
7b. Vertical arm
8. Clamping means
9. Model
S: Separation contour
Z', Z": First axis and second axis
X: Radial direction
A, B: Rotational direction FIG. 1 shows an embodiment of the device (1) for separating a deep-drawn jaw-spanning dental apparatus (2) such as an aligner or a bite splint of thermoform film (3). The device (1) comprises: a separating element (4) for thermally separating the deep-drawn thermoform film (3) and simultaneously refining the separated deep-drawn thermoform film (3); a heating means (5) for regulating the heating of the separating element (4) so as to increase the temperature of the thermoform film (3) substantially to at least its glass temperature; a support (6) for supporting the deep-drawn thermoform film (3) relatively movable with respect to the separating element (4); a moving mechanism (7) for moving the separating element (4) along a separation contour (S) of the deep-drawn jaw-spanning dental apparatus (2) relative to the support (6); and a control unit adapted to control the heating means (5) and the moving mechanism (7) based on the separation contour (S). The temperature can be varied in a broad range preferably between 100 to 300 degrees Celsius. The device (1) further comprises: a temperature sensor for sensing the temperature of the thermoform film (3) in close proximity to the separating element (4). And the heating means (5) is further adapted to regulate heating of the separating element (4) based on the sensed temperature. The thermoform film (3) is preferably made of Polymethylmethacrylate. And the heating means (5) is adapted to regulate heating of the separating element (4) so as to increase the temperature of the thermoform substantially to at least 105 degrees Celsius which corresponds to the glass temperature of Polymethylmethacrylate. The glass temperature may vary according to the type of the PMMA used. The heating means can be set by the user according to the thermoform film (3) to be separated. The moving mechanism (7) comprises a first rotating means for rotating the support (6) around a first axis (z') along a rotational direction (A). The moving mechanism (7) further comprises a height adjusting means for changing the position of the support (6) along the first axis (z'). The moving mechanism (7) further comprises a radial guiding means (7a) for radially moving the separating element (4) along the radial direction (X) towards or away from the first axis (z') of the support (6). The radial guiding means (7a) comprises a rotatable arm (7b) for supporting the separating element (4) in the radial direction (X). The moving mechanism (7) further comprises a second rotating means for rotating the rotatable arm (7b) around a second axis (z") along a rotational direction (B). The moving mechanism (7) may further comprise another height means for changing the position of the separating element (4) along the second axis (z"). The first axis (z') and the second axis (z") are parallel. Alternatively, they may be non-parallel. The device (1) further comprises: a clamping means (8), preferably brackets which engage with the support (6), for clamping the thermoform film (3) of the deep-drawn jaw-spanning dental apparatus (2) on a corresponding model (9) to the support (6). The support (6) comprises a turntable (6a) for supporting the deep-drawn thermoform film (3) relatively movable with respect to the separating element (4). The separating element (4) is provided in the form of a spike, made from metal, preferably iron, which is protruding in the radial direction (X). Alternatively, the separating element (4) may be provided in the form of a knife, chisel, or needle which is protruding in the radial direction (X). The control means is further adapted to control the second rotating means so as to rotate the arm (7b) around the second axis (z") such that the separating element (4) points substantially in the direction of the radius of curvature at the corresponding separation contour. The device (1) further comprises: a CAD/CAM means for receiving or constructing information on the separation contour (S) of the deep-drawn jaw-spanning dental apparatus (2). The device (1) further comprises: a sensor for detecting the position of the separation element (4). The control means is further adapted to calibrate the moving mechanism (7) by moving the separation element (4) to one or more reference points relative to the support (6) and the deep-drawn jaw-spanning dental apparatus (2), and detecting the positions of the separation element (4) as it is moved to one or more reference points. The calibration is based on the detection. The device (1) further comprises: a deep-drawing means for deep-drawing thermoform film (3) using a model (9) to manufacture a deep-drawn jaw-spanning dental apparatus (2) such as an aligner or a bite splint. The deep-drawing means is arranged directly above the support (6). The control unit is further adapted to control the deep-drawing means.

The present invention also provides a method of using the device (1). The method comprises: a step of deep-drawing a thermoform film (3) using a model (9) to manufacture a jaw-spanning dental apparatus (2) such as an aligner or a bite splint; and a step of separating and refining the deep-drawn thermoform film (3) while being clamped and supported by the model (9) on the support (6) and by moving the heated separating element (4) along a separation contour (S) on the thermoform film (3) or the model (9).

The invention claimed is:

1. A device comprising: a separating element configured to thermally separate a deep-drawn thermoform film and simultaneously refine the separated deep-drawn thermoform film; a heating means configured to regulate a heating of the separating element so as to increase the temperature of the thermoform film to at least a glass transition temperature of the thermoform film; a support configured to support the deep-drawn thermoform film relatively movable with respect to the separating element; a moving mechanism configured to move the separating element along a separation contour of a deep-drawn jaw-spanning dental apparatus relative to the support; and a control unit adapted to control the heating means and the moving mechanism based on the separation contour.

2. The device according to claim 1, further comprising: a temperature sensor configured to sense the temperature of the thermoform film in close proximity to the separating element, wherein the heating means is further adapted to regulate heating of the separating element based on the sensed temperature.

3. The device according to claim 1, wherein the heating means is further adapted to regulate heating of the separating element so as to increase the temperature of the thermoform film to at least 105 degrees Celsius.

4. The device according to claim 1, wherein the moving mechanism comprises: a first rotating means for rotating the support around a first axis; and a height adjusting means for changing the position of the support along the first axis.

5. The device according to claim 4, wherein the moving mechanism comprises: a radial guiding means for radially moving the separating element towards or away from the first axis of the support.

6. The device according to claim 5, wherein the radial guiding means comprises a rotatable arm for supporting the separating element in the radial direction; and the moving mechanism comprises: a second rotating means for rotating the rotatable arm around a second axis.

7. The device according to claim 6, wherein the control unit is further adapted to control the second rotating means so as to rotate the arm around the second axis such that the separating element points substantially in the direction of the radius of curvature at the corresponding portion of the separation contour.

8. The device according to claim 1, further comprising: a clamping means for clamping the thermoform film of the deep-drawn jaw-spanning dental apparatus on a corresponding model to the support.

9. The device according to claim 1, wherein the support comprises a turntable for supporting the deep-drawn thermoform film relatively movable with respect to the separating element.

10. The device according to claim 1, wherein the separating element is provided in the form of a knife, chisel, spike, or needle which is protruding in a radial direction.

11. The device according to claim 1, further comprising: a CAD/CAM means for receiving or constructing information on the separation contour of the deep-drawn jaw-spanning dental apparatus.

12. The device according to claim 1, further comprising: a sensor configured to detect the position of the separating element; the control unit is further configured to calibrate the moving mechanism by moving the separating element to one or more reference points relative to the support and the deep-drawn jaw-spanning dental apparatus, and to detect the positions of the separating element as it is moved to the one or more reference points.

13. The device according to claim 1, further comprising: a deep-drawing means for deep-drawing thermoform film using a model to be placed on the support, to manufacture the deep-drawn jaw-spanning dental apparatus, wherein the deep-drawing means is arranged above the support, and wherein the control unit is further adapted to control the deep-drawing means.

14. A method of using the device according to claim 1, comprising: deep-drawing a thermoform film using a model to manufacture a jaw-spanning dental apparatus; separating and refining the deep-drawn thermoform film while being clamped and supported by the model on the support and by moving the heated separating element along a separation contour on the thermoform film or the model.

\* \* \* \* \*

UNITED STATES PATENT AND TRADEMARK OFFICE
CERTIFICATE OF CORRECTION

PATENT NO. : 12,280,532 B2  
APPLICATION NO. : 17/915346  
DATED : April 22, 2025  
INVENTOR(S) : Schneider et al.

Page 1 of 1

It is certified that error appears in the above-identified patent and that said Letters Patent is hereby corrected as shown below:

On the Title Page

In Column 1, Item (30) under "Foreign Application Priority Data", Line 1, delete "Mar. 20, 2020" and insert --Mar. 30, 2020-- therefor Signed and Sealed this  
Fifteenth Day of July, 2025

Coke Morgan Stewart  
*Acting Director of the United States Patent and Trademark Office*